United States Patent
Brown, Jr.

(10) Patent No.: US 6,468,625 B1
(45) Date of Patent: Oct. 22, 2002

(54) LAMINATE CONFIGURATION FOR REINFORCING GLULAM BEAMS

(75) Inventor: Gordon L. Brown, Jr., Anderson, SC (US)

(73) Assignee: Hexcel CS Corporation, Stamford, CT (US)

( * ) Notice: Subject to any disclaimer, the term of this patent is extended or adjusted under 35 U.S.C. 154(b) by 10 days.

(21) Appl. No.: 09/663,274

(22) Filed: Sep. 18, 2000

Related U.S. Application Data

(62) Division of application No. 08/852,577, filed on May 7, 1997, now Pat. No. 6,174,483.

(51) Int. Cl.[7] ............................................. B32B 5/12
(52) U.S. Cl. ..................... 428/114; 428/155; 428/174; 428/192; 428/292.1; 428/537.1; 428/902
(58) Field of Search ........................... 428/96, 114, 141, 428/172, 902, 292.1, 155, 537.1, 174, 192

(56) References Cited

U.S. PATENT DOCUMENTS

| | | | |
|---|---|---|---|
| 2,643,603 A | 4/1953 | Byars et al. | |
| 3,270,103 A | 8/1966 | Kurtz | |
| 3,397,626 A | 8/1968 | Kornick et al. | |
| 3,844,822 A | 10/1974 | Boss et al. | |
| 3,873,399 A | * 3/1975 | Goldsworthy et al. | 156/441 |
| 4,088,708 A | 5/1978 | Riew | |
| 4,168,924 A | 9/1979 | Draper et al. | |
| 4,242,779 A | 1/1981 | Curinier et al. | |
| 4,379,798 A | 4/1983 | Palmer et al. | |
| 4,413,391 A | 11/1983 | Renjilian et al. | |
| 4,510,198 A | 4/1985 | Rheaume | |
| 4,617,219 A | 10/1986 | Schupack | |
| 4,680,213 A | 7/1987 | Fourezon | |
| 4,683,018 A | 7/1987 | Sutcliffe et al. | |
| 4,699,542 A | 10/1987 | Shoesmith | |
| 4,725,485 A | 2/1988 | Hirokawa | |
| 4,777,005 A | 10/1988 | Miller | |
| 4,892,600 A | 1/1990 | Beever | |

(List continued on next page.)

FOREIGN PATENT DOCUMENTS

| | | |
|---|---|---|
| CA | 1 240 873 | 8/1988 |
| DE | 1 479 974 | 7/1969 |
| DE | 23 57 557 | 4/1975 |
| DE | 31 20 661 | 12/1982 |
| EP | 0 241 803 | 10/1987 |
| EP | 0 297 006 | 12/1988 |
| EP | 0 318 707 | 6/1989 |
| EP | 0 387 968 | 9/1990 |
| EP | 0 637 658 | 2/1995 |
| GB | 2 048 971 | 12/1980 |
| GB | 2 173 152 A | 10/1986 |
| GB | 2 191 115 A | 12/1987 |

Primary Examiner—Elizabeth M. Cole
(74) Attorney, Agent, or Firm—Alston & Bird LLP

(57) ABSTRACT

A reinforcing lamina sheet and a process of making a reinforcing sheet for use in a glue laminated beam. The reinforcing lamina sheet increases the compressive and/or tensile strength of the glue laminate beam. The lamina sheet is formed from unidirectionally oriented reinforcing filaments, preferably aramid filaments in an epoxy resin, and is cured in a curved configuration. The resulting lamina sheet includes filaments which are uniformly tensioned and, therefore, when a load is applied to the glue laminate beam having the reinforcing lamina sheet, the fibers receive the load substantially simultaneously. The process of forming the lamina sheet includes drawing reinforcement yarns through a resin bath to form a resin impregnated substantially planar yarn band, contacting one side of the resulting impregnated band with a curved heated surface to promote partial curing of at least the contacting surface of the band, and further applying heat to at least the opposite side of the partially cured band.

11 Claims, 3 Drawing Sheets

U.S. PATENT DOCUMENTS

| | | |
|---|---|---|
| 4,902,548 A | 2/1990 | Cholat-Serpoud et al. |
| 4,910,076 A | 3/1990 | Ando et al. |
| 4,919,739 A | 4/1990 | Dyksterhouse et al. |
| 4,955,803 A | 9/1990 | Miller et al. |
| 4,957,390 A | 9/1990 | Shoesmith |
| 4,966,801 A | 10/1990 | Becker et al. |
| 4,996,816 A | 3/1991 | Wiebe |
| 5,102,609 A | 4/1992 | Miller et al. |
| 5,110,627 A | 5/1992 | Shoesmith et al. |
| 5,158,821 A | 10/1992 | Gebauer et al. |
| 5,246,306 A | 9/1993 | Shoesmith et al. |
| 5,273,804 A | 12/1993 | Brian et al. |
| 5,344,602 A | 9/1994 | Yencho |
| 5,362,545 A | 11/1994 | Tingley |
| 5,372,868 A | 12/1994 | Prewo et al. |
| 5,415,943 A | 5/1995 | Groger et al. |
| 5,456,781 A | 10/1995 | Tingley |
| 5,498,460 A * | 3/1996 | Tingley .................. 428/96 |
| 5,547,729 A | 8/1996 | Tingley |

* cited by examiner

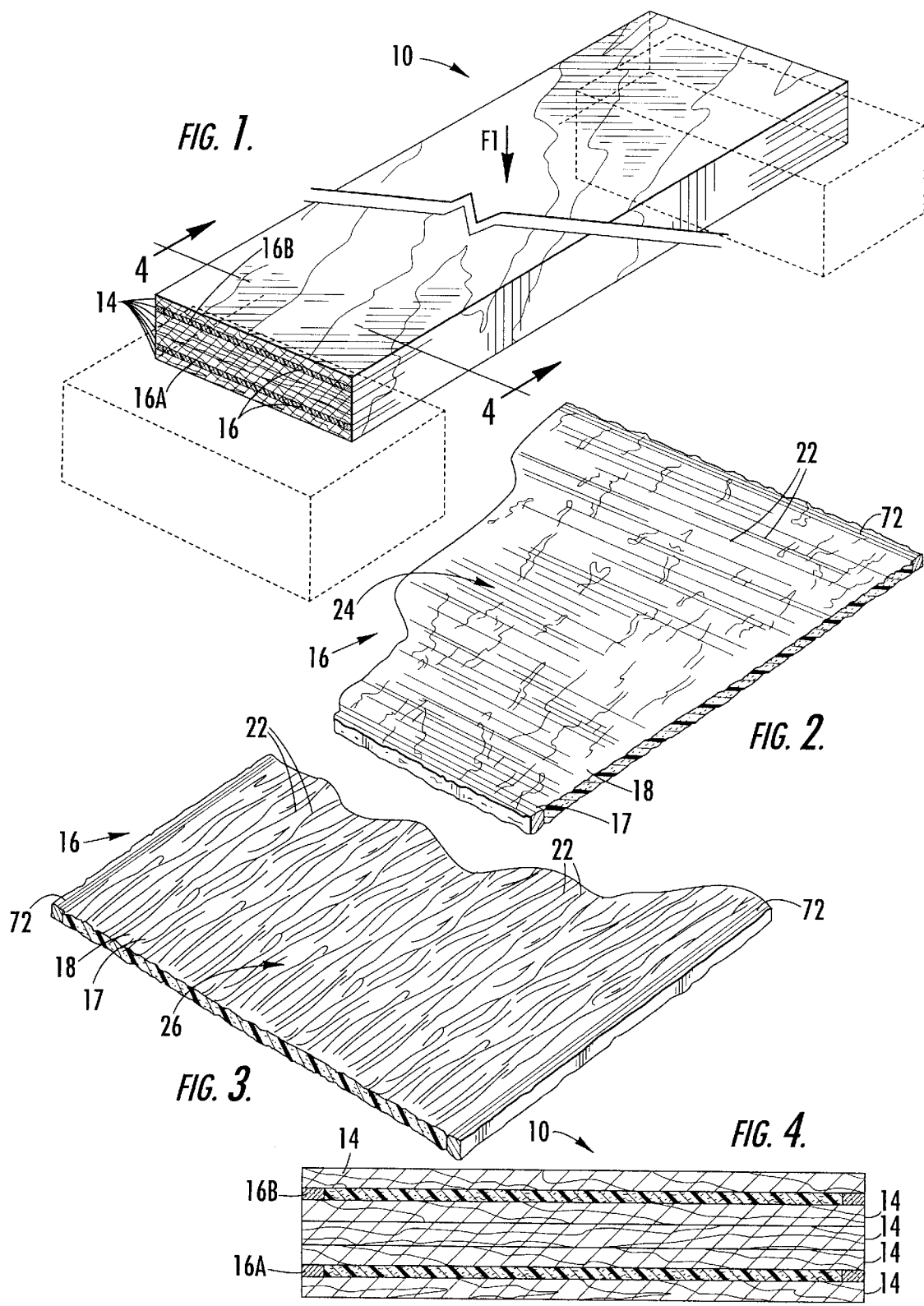

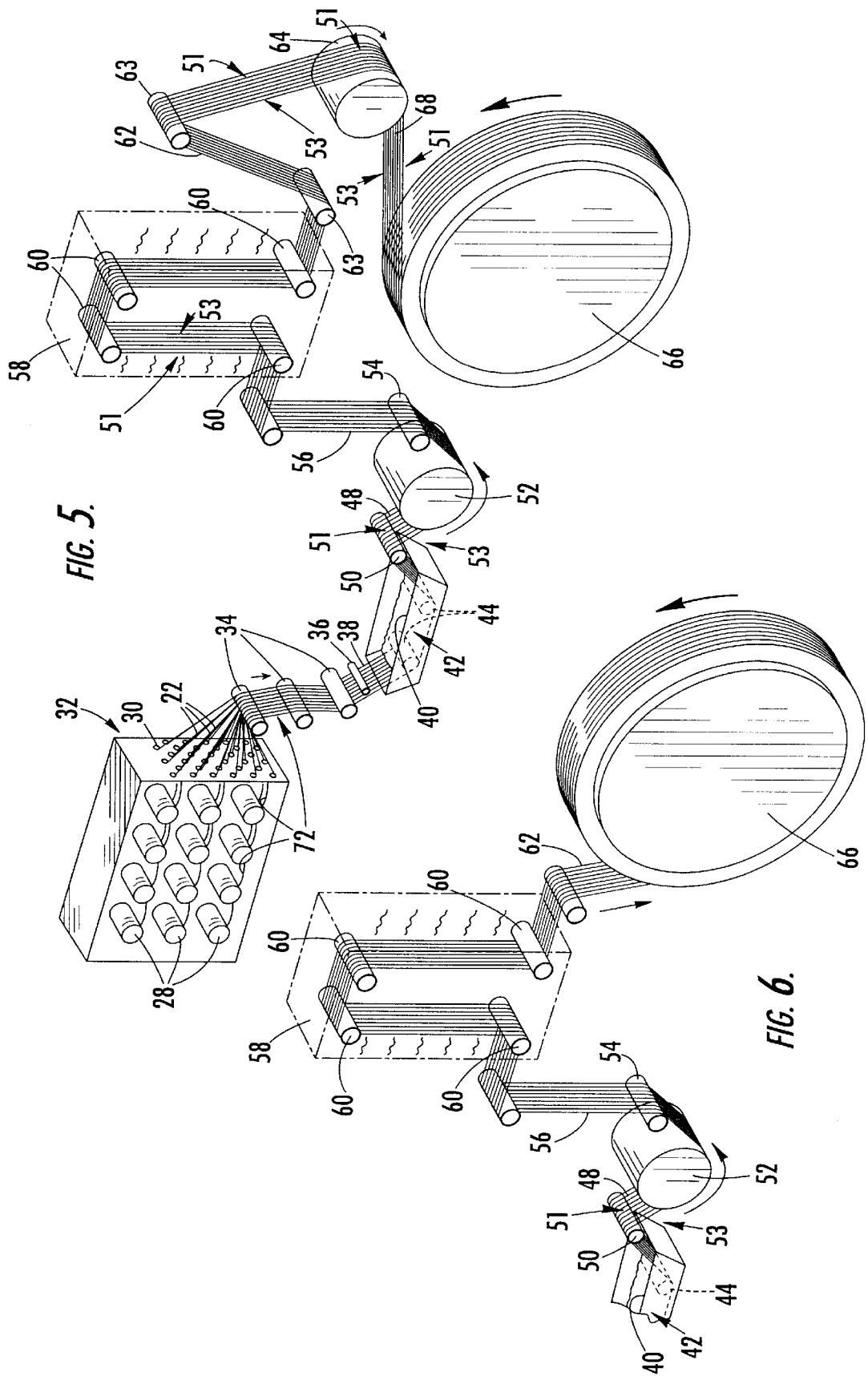

LAMINATE CONFIGURATION FOR REINFORCING GLULAM BEAMS

CROSS-REFERENCE TO RELATED APPLICATION

This application is a division of application Ser. No. 08/852,577, filed May 7, 1997 and allowed Aug. 16, 2000, now U.S. Pat. No. 6,174,483.

FIELD OF THE INVENTION

The present invention is directed to a reinforcing lamina sheet for use in multiple layer structural laminates such as reinforced beams, and to processes for forming same, and to laminates made therefrom.

BACKGROUND OF THE INVENTION

Reinforced glue laminate beams, or reinforced glulam beams, are wood laminates which are reinforced with one or more synthetic layers. Glulam beams are frequently used in place of conventional wood products such as beams, columns, cantilevered supports or trusses to provide structural support and integrity in the construction industry. Glulam beams are structurally more sound and are often less expensive than conventional wood products. The synthetic reinforcement layers are typically positioned between individual wood layers of the glulam beam to improve the tensile or compressive loading of the resulting beam.

Current commercially significant glulam beams comprise layers arranged such that the synthetic layers are near both exterior surfaces of the beams, e.g., wood/reinforcing lamina sheet/wood/wood/reinforcing lamina sheet/wood. The strength of the glulam beam is a function of the ability of the reinforcing lamina sheet to take load uniformly and the degree of adhesiveness between the individual lamina within the glulam beam. In this arrangement, the reinforcing lamina sheet positioned between the uppermost wood lamina and the second wood lamina is subjected to substantially pure compressive stresses when the glulam beam is used in a construction project such as a building. The reinforcing lamina sheet positioned between the lowermost lamina and the adjacent lamina is subjected to substantially pure tensile stress.

The reinforcing lamina sheets for glulam beams are typically formed of unidirectionally oriented fibers in a resin encasement that surrounds the fibers and fills the interstices between the fibers. The reinforcing lamina sheet is then selectively positioned within the glulam beam to improve the tensile or compressive properties of the beam. The reinforcing lamina sheets are typically adhered to the wood lamina by a commercial grade non-epoxy adhesive such as a resorcinol based adhesive. When the reinforcing lamina sheet comprises aramid fibers or other high strength fibers, it is often difficult to cut the final beam to a desired length or to a different width, or to finish the edges of the glulam beam.

Prior art reinforcing lamina sheets are generally formed by a fabrication process referred to as pultrusion. Pultrusion is a continuous manufacturing process for producing fiber reinforced plastic parts of indefinite length. Pultrusion involves pulling the flexible reinforcing fibers through a liquid resin bath and then densely compacting the saturated fibers through a heated die where the reinforced plastic is shaped according to the die mold and the resin cured. A drawback of this process is that the heated die step of the conventional pultrusion process subjects the composite material to significant pressure, often in the range of 50–80 psi. The surfaces of a pultruded reinforcing lamina sheet are generally smooth with little or no aramid fibers along its outermost surface. Accordingly, the surface must be abraded so that an adhesive will bond to the aramid fibers to an adjacent lamina, i.e., wood or reinforcing lamina sheet. Also, the unidirectional fibers of the pultruded reinforcing laminates are not uniformly tensioned throughout the process and, therefore, when stressed within a glulam beam, do not uniformly receive load.

An example of the prior art is U.S. Pat. Nos. 5,498,460, 5,456,781, and 5,362,545 all to Tingley. The Tingley '545 patent describes a conventional process for forming glulam beams. Specifically, the laminate is pultruded in a straight fashion. The pultruded composite is then abraded to expose the aramid fibers in order to get a proper degree of adhesion between the wood and the composite using conventional adhesives. Once the composite is formed, the layers are glued together forming the beam and the beam is compressed using multiple "C-clamps" at a minimum of 100 psi with the general rule for soft woods being 125–150 psi. The beam is then cured at room temperature and allowed to sit for approximately 24 hours in its compressed state. Once the glue has hardened, the C-clamps are removed from the glulam beam and the beam is finished by trimming the sides and polished to prepare the beam for commercial sale.

The Tingley '460 and Tingley '781 patents are similar to the Tingley '545 patent. The Tingley '460 patent describes providing recesses in the laminate to facilitate adhesion between the fiber reinforced lamina and the wood layers. The Tingley '460 patent forms these recesses by either providing a material which is nonreactive with the resin additive and removing it after the composite is formed, using a nonreactive gas or low boiling point liquid which dissipates as the resin is being cured, or abrading the composite as described in the Tingley '545 patent. The Tingley '781 patent also describes the use of the abrasion process and further describes the importance of covering the complete surface of the reinforcement with adhesive.

SUMMARY OF THE INVENTION

The present invention provides a reinforcing lamina sheet for forming adhesive-bonded multiple layer structural laminates, preferably glulam beams. The reinforcing lamina sheet of the invention is formed of pre-tensioned, unidirectional, i.e., substantially parallel, reinforcing filaments, preferably in the form of multifilament yarns, in combination with a resin matrix. The reinforcing lamina sheet of the invention exhibits a generally rough surface and has a relatively low density as compared to reinforcing lamina sheets prepared by conventional pultrusion processes, and can readily be glued to other sheets or substrates without special surface preparation. Preferred lamina of the invention minimize difficulties and costs associated with machining and/or trimming a completed, multilayer structural member into a finished form.

In accord with the invention, continuous filament yarns of high strength reinforcing materials, preferably aramid multifilament yarns, are formed into a unidirectional, substantially planar band which is impregnated with a thermoset resin, such as an epoxy resin, to form an impregnated band. The impregnated band of unidirectionally oriented filaments is heated on at least one side while it is maintained in a curved configuration under tension. Preferably the heating step is effected by passing the impregnated band in the length-wise direction into contact on a first side thereof with a curved hot surface, such as a large diameter roll or drum that is continuously heated by oil, to promote cross-linking and partial curing of the thermoset resin while the band is in the curved configuration. Accordingly, the impregnated band is partially cured in an arcuate, i.e., curved, configuration along the length of the band. The partially cured, arcuate band is then transported to a further heat zone which, according to various embodiments of the present invention, is advantageously either a heated chamber or another curved, heated surface such as a second oil can. Then at least the side of the band opposite the first side is heated to further promote curing and cross-linking while the band is maintained in a second configuration different from the first configuration. The second configuration can be a flat configuration or a configuration curved in a direction opposite the first configuration.

The band is uniformly tensioned throughout the process by rollers or the like. The uniform tension applied to the band in the second configuration causes at least the curved first outer surface of the band to fracture, typically by cracking, in the lengthwise direction and also in the transverse direction to a lesser extent. The fractures or cracks in the surface of the band facilitate bonding between the reinforcing lamina sheet end the wood layers of the glulam beam by allowing the adhesive used to glue the lamina sheet to the wood layers to penetrate into the lamina sheet.

In a preferred embodiment, the band is conveyed after heating and partial curing in the initial curved configuration, under substantially uniform tension through an oven or other heated chamber wherein both sides of the band are contacted with heat while the band is flexed and bent by pulling it under tension across one or more rollers. The band is then passed into contact with a second, large diameter curved heated surface which further cures the side of the band opposite the side contacted by the first heated curved surface. The substantially cured continuous laminate sheet is then wound about a mandrel with the sheet being oriented in the same direction of curvature as the first configuration, and is maintained in the curved configuration during subsequent storage and transport, prior to its use in forming a structural laminate.

In another preferred embodiment, contiguous groups of low tensile strength non-aramid filaments or yarns are incorporated in the unidirectional aramid filament band to form discreet, narrow, unidirectional portions of the band. For instance, rayon or similar fiber can be used to form selvage-like edges of he band. The non-aramid portions of the band can also be provided in one or more medial portions of the band to enhance the separation of various widths of the reinforcing lamina sheet. The selvage-like edges facilitate the finishing and trimming processes that are applied to laminates containing one or more lamina sheets of the invention because the lower tensile strength fibers forming the selvage edges are easier to grind, machine, and cut than aramid fibers.

The reinforcing filaments in the lamina sheets of the invention are substantially uniformly tensioned which in turn maximizes strength contributions to multiple layer laminates such as glulam beams, prepared using the lamina of the invention. The curvature of the lamina of the invention can enhance and improve the beam strength of a glulam beam as compared to similar beams prepared using conventional flat lamina. Additionally, although cracking normally represents a degradation in a composite product, the rough and irregular surfaces of the lamina of the invention provide laminate beams with improved shear strength by improving bonding of the lamina to other layers used to form a laminate. Preferably, the lamina of the invention comprise an epoxy resin matrix which readily bonds with high strength to adhesives typically used to form cellulosic-based laminates, such as glulam beams. Moreover, the low tensile strength fibers in the laminate decrease the cost associated with trimming the completed beam.

BRIEF DESCRIPTION OF THE DRAWINGS

The foregoing and other objects, features, and advantages of the present invention will be made apparent from the following detailed description of the preferred embodiment of the invention and from the drawings, in which:

FIG. 1 is a perspective view of illustrating a glue laminate beam according to the present invention;

FIG. 2 is a perspective view illustrating one surface of a preferred reinforcing lamina sheet according to the present invention;

FIG. 3 is a perspective view illustrating the opposite surface of the reinforcing lamina sheet of FIG. 2;

FIG. 4 is a cross-sectional view of the glue laminate beam of FIG. 1, taken along line 3—3 thereof;

FIG. 5 is a schematic view of one preferred process for forming a continuous lamina sheet according to the invention;

FIG. 6 is a schematic view of another preferred process for forming a continuous lamina sheet according to the invention;

DETAILED DESCRIPTION OF THE PREFERRED EMBODIMENTS

Figure 7:
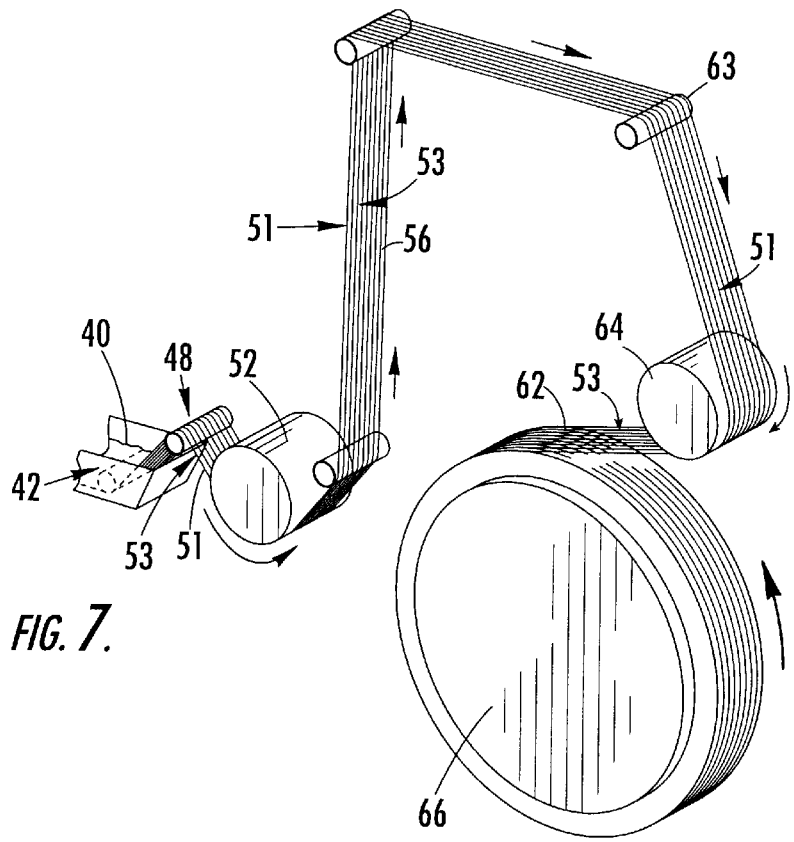
FIG. 7 is a schematic view of yet another preferred process for forming a continuous lamina sheet according to the invention.

The present invention will now be described more fully in detail with reference to the accompanying drawings, in which preferred embodiments of the invention are shown. This invention should not, however, be construed as limited to the embodiments set forth herein; rather, they are provided so that this disclosure will be thorough and complete and will fully enable practice of the invention to those skilled in the art, including the best mode thereof.

FIGS. 1 and 4 illustrate a glue laminate beam 10 according to the invention. In the arrangement illustrated, the glue laminate beam 10 extends across support members (shown in phantom) wherein it is positioned to receive load applied in the direction and location indicated by arrow F1. The glue laminate beam includes a plurality of wood layers 14 and a plurality of reinforcing lamina sheets 16. When the beam is stressed as indicated in FIG. 1, the lowermost lamina 16A is subjected to a high level of tensile stress while the uppermost lamina 16B is subjected to a high degree of compressive stress. Accordingly, because the stresses applied to the beam are concentrated at the exterior surfaces thereof, the lamina of the invention are preferably positioned near the exterior surfaces of the beam in order to efficiently improve the beam strength of the glue laminate beam 10 as illustrated in FIG. 4.

As explained in greater detail below, the surface of the reinforcing lamina sheet 16 of the invention is a generally rough surface having a plurality of narrow, longitudinally extending depressions 17 and ridges 18 together with transversely extending, visible fracture lines as illustrated in FIGS. 2 and 3. High strength reinforcement filamentary yarns 22 are visible on each of the top surface 24 of the lamina shown in FIG. 2, and on the bottom surface 26 of the lamina shown in FIG. 3. The yarns 22 adjacent the bottom surface 26 of the lamina (FIG. 3) are longer per unit length of the lamina than yarns 22 adjacent the top surface 24 of the lamina (FIG. 2) as indicated by the wavy orientation of the yarns 22 adjacent the bottom surface 26 of the lamina (FIG. 3) and the straight orientation of the yarns 22 adjacent the top surface 24 of the lamina (FIG. 2) as also explained in greater detail below.

One preferred continuous process for forming the lamina sheets 16 is schematically depicted in FIG. 5. A plurality of creels 28 supply continuous high strength reinforcing yarns, preferably multifilament aramid yarns 22 to be processed. The individual threadlines or yarns 22 are pulled from the creels 28 through one of a plurality of guides, illustrated as openings 30 defined by a card 32. The guides maintain the separation and relative alignment of the yarns 22 and prevent entanglement of the yarns 22 with each other. A plurality of rolls 34, maintain the yarns 22 under tension as each yarn 22 is pulled from a respective creel 28.

A plurality of closely adjacent guides in the form of a comb 36, or the like, are positioned downstream of the tension rolls 34. The yarns 22 are fed under tension between the teeth of the comb 36 in order to form the yarns 22 into a warp or planar band 38 of substantially unidirectional, i.e., parallel, yarns 22. A plurality of individual threadlines or yarns 22 are stacked, one above the other, between each set of teeth of the comb 36, so that the planar yarn band 38 has an average thickness of several individual yarns 22, typically about 2 to about 10 yarns or threadlines depending on various factors such as yarn denier, preferably about 3 to about 6 yarns. Although various reinforcing yarns can be used in accord with the invention as will be apparent to the skilled artisan, advantageously the yarns 22 are aramid yarns, each having a total denier of between 364 and 14490, and a total number of filaments in each yarn ranging from about 250 to about 10,000. In one preferred embodiment, 7,245 denier aramid yarns having a filament count of 5,000 are stacked to provide a yarn band 38 having a thickness of between about 0.06 to about 0.08 in. (1.5 to 2.0 mm.).

The yarn band 38 is then impregnated with a hardenable liquid resin 40 by any of various processes including spraying, padding, dipping or like processes. Advantageously the yarn band 38 is passed through a liquid resin bath 42 in order to impregnate the yarn band 38 with the liquid resin 40 so that the individual yarns 22 forming the band 38 are each coated with the liquid resin 40. At least one and preferably two rollers 44 are positioned within the bath 42 to maintain tension on the planar yarn band 38 during passage of same through the liquid resin bath 42. The liquid resin 40 applied via the resin bath 42 is preferably an epoxy resin and can be applied to the yarn band 38 at ambient or an elevated temperature depending on the specific composition, concentration, viscosity, etc. of the resin 40. Particularly preferred epoxy resins for application to aramid yarns are Bisphenol A epoxy resin, commercially available as Epon 828 from Shell Chemical Co., P.O. Box 1380, 3333 Highway 6S., Houston, Tex. 77251, or Polyglycidyl ether flexabilizer, commercially available as Heloxy 505 from Shell Chemical Co., or Imidazole curing agent, commercially available as Imicure AMI-2 from Air Products, P.O. Box 25760, Leigh Valley, Pa. 18002.

Sufficient liquid resin 40 is applied to the planar yarn band 38 during passage through the resin bath 42, that the yarn band 38 becomes saturated with the liquid resin 40 and so that each of the individual yarns 22 are coated with the liquid resin 40. Advantageously a kiss roll or doctor blade roll (not shown) is positioned at the downstream end of the resin bath 42 to remove excess liquid resin from the yarn band as it exits the bath 42. Preferably, the aramid yarn band 38 is impregnated with the epoxy resin 40 in an amount sufficient coat each filament in each individual yarn 22 in the yarn band 38 but insufficient to provide a continuous resin layer or matrix that fully encapsulates the yarn band 38 and surfaces thereof. Advantageously the liquid resin 40 is applied to the yarn band 38 in an amount sufficient to provide a liquid resin pick-up of at least about 20% by weight, based on the weight of the yarns, more preferably between about 20% to 100% by weight, most preferably 55% by weight based on the weight of the yarn.

The liquid resin impregnated yarn band exits the resin bath in the form of an impregnated yarn band 48. A tension roll 50 which can be one or a plurality of rolls is provided to maintain constant tension of the now impregnated band 48. The impregnated band 48 is then passed, while maintained under tension, to a first heating zone where one surface 51 of the two opposed surfaces, 51 and 53, of the impregnated band 48 is brought into intimate contact with the curved heated surface of a large diameter hot oil filled drum or roll 52. Preferably, oil filled drum or roll 52 has a diameter of between about one and about four feet (1 to 4 ft.) and, more preferably, has a diameter of about one meter (1 m). The outer surface of the heated drum 52 is advantageously covered with a nonstick coating, such as a polytetrafluoroethylene (PTFE) coating material, commercially available under the trademark TEFLON, or the like, so that the impregnated yarn band 48 does not adhere or stick to the surface of the heated drum 52. Although heating of the drum 52 is advantageously accomplished by heated oil within the interior of the drum, heating of the drum surface can be accomplished by various alternative arrangements including embedded heating elements or the like as will be apparent. Advantageously the drum 52 is heated sufficiently to maintain the surface thereof at a temperature of between 200–500° F. and, preferably, about 400° F.

A tension roll 54 positioned downstream of the heated drum 52 cooperate with the upstream tension roll 50 to maintain substantial tension on the impregnated yarn band 48 as the surface 51 thereof is brought into contact with the curved surface of the heated drum 52. In addition, as seen in FIG. 5 the contacting surfaces of the tension rolls 54 and 50 are offset from the contacting surface of the heated drum 52 so that the feed direction of the impregnated yarn band 48 is partially reversed as the surface 51 contacts heated drum 52. As a result, the impregnated yarn band 48 is brought into pressure contact with a substantial portion of the curved surface of heated drum 52. Advantageously, the heated drum 52 is rotated to minimize the effects of friction on the impregnated yarn band 48 as the surface 51 thereof contacts the drum 52.

As the surface 51 of the impregnated yarn band 48 contacts the heated surface of roll 52 under pressure, crosslinking of the liquid resin in the impregnated yarn band 48 is initiated. The temperature of the surface of the drum 52 and the length of contact between the surface 51 of the impregnated yarn band 48 and the surface of the drum 52 are sufficient to partially cure the liquid resin in the impregnated yarn band 48 so that the impregnated yarn band 48 is consolidated into a coherent, shaped structure of generally fixed width by contact with the heated drum 52. The degree of cure achieved by contact between the impregnated yarn band 48 and the drum 52 is insufficient to fully cure the liquid resin in the impregnated yarn band 48; however, the degree of cure is normally sufficient that the surface of the impregnated yarn band 48 becomes smooth and that impregnated band 48 is sufficiently cured so that it is set in a curved configuration.

The partially cured, shaped yarn band 56 is passed from the heated drum 52 via tension roll 54 to a second heat zone, which in the embodiment of the invention illustrated in FIG. 5, is an oven 58, heated by forced air, radiant heat, or the like. The oven 58 applies heat to the surface 51 of the partially cured band 56 that contacted the heated surface of drum 52, and also to the opposite surface and 53 of the partially cured band 56 thereby further promoting the curing of the partially cured resin in the band. Preferably the temperature of the oven 58 is maintained at a temperature of between about 200 and 500° F. and, more preferably, about or less than about 400° F.

The oven 58 preferably includes at least one, and more preferably a plurality of guide rolls 60 that change the direction of the partially cured band 56, e.g., from a horizontal to a vertical direction, while the band is continuously passed through the oven 58 and maintained under tension. As the partially cured band 56 passes across such guide rolls 60, the band 56 is bent or flexed, preferably in the opposite direction of curvature as compared to the direction of curvature as was imparted to the band by partial curing of the band during contact with the heated drum 52 in the first heating zone. When bent or flexed in a direction of curvature opposite that imparted to the band by contact with the heated drum 52, the initially heated, generally smooth surface 51 of the partially cured band 56 is stretched and fractured while further curing of the partially cured resin in the band is effected by the heat applied to the band. Although the resin fractures, the aramid fibers are substantially undamaged. A substantially cured band 62 is removed from the oven 48.

The substantially cured band 62 removed from the oven 58 is then passed, under tension maintained by one or more tension rolls 63 to a third heating zone where the second surface 53 of the now substantially cured band 48 is brought into intimate contact with the curved heated surface of a large diameter hot oil filled drum or roll 64 that is similar or identical to the hot oil filled drum 52 in the first heating zone. Like the first hot oil drum 52 the drum 64 is heated sufficiently to maintain the surface thereof at a temperature of between 200–500° F. and, preferably, about 400° F. In the third heating zone, the second surface 53 of the substantially cured band 62 is brought into pressure contact with a substantial portion of the curved surface of heated drum 64. Although the band 62 is substantially cured as it enters into the third heating zone, it is relatively hot due to the heat imparted to the band in the first two heating zones, and also because of the exothermic curing of the epoxy resin, so that the band is still flexible and can be readily bent for contact between the second surface of the band 53 and the surface of the heated drum 64.

As the second surface 53 of the substantially cured band 62 contacts the heated surface of roll 64 under pressure, still further cross-linking of the resin in the yarn band is effected. In addition, as the substantially cured band 62 is pulled around the heated drum 64, at least the curved first surface 51 of the substantially cured band 62 is stretched and further fractured. At the same time, the second surface 53 becomes more smooth due to the application of heat and tension. The cured band 68 exiting the third heating zone is a stably cured composite lamina. The cured band 68 is removed from the third heating zone and is wound onto a mandrel 66 for storage and transportation. As shown in FIG. 5, the cured band 68, which is still shaped in the direction of curvature imparted by the first heated drum 52, is then wound onto the mandrel 66 with a direction of curvature consistent with the direction of curvature resulting from the initial curing effected by contact with the heated surface of the first heated drum 52. Stated differently, the first surface 51 of the band faces inwardly on the mandrel 66 and the second surface 53 faces outwardly. As the cured band 68 cools on the mandrel 66 the flexibility of the band decreases so that the cured band 68 is set in a curved state in its final form.

FIGS. 2 and 3 illustrate a reinforcing lamina sheet 16 severed from the cured band 68 supported about the mandrel 66. The reinforcing lamina sheet 16 includes an irregular or discontinuous upper surface 24 due, at least in part, to the fracturing which occurred when the partially and substantially cured band, 56 and 62 respectively, were tensioned around the guide roll 60 and heated roll 64, respectively, in the process illustrated in FIG. 5. Although the surface 24 is fractured in a portion thereof, the epoxy resin has fixed the relationship of one bundle of aramid yarns 22 relative to another. In addition, both the upper surface 24 and the lower surface 26 (FIG. 3) of the reinforcing lamina sheet 16 of the invention are generally rough surfaces having a plurality of narrow, longitudinally extending depressions 17 and ridges 18 as illustrated in FIGS. 2 and 3. The depressions 17 and ridges 18 are believed to be the result of different factors including the relatively low resin content of the lamina and also the opposing stresses applied to the different faces of the fiber band as it was flexed in different directions during the process illustrated in FIG. 5.

Because the initial setting of the epoxy resin has fixed the relationship of the aramid yarns 22 relative to each other while the band was a state of relatively high curvature, the yarns 22 adjacent the bottom surface 26 of the lamina (FIG. 3) are longer per unit length of the lamina than yarns 22 adjacent the top surface 24 of the lamina (FIG. 2) as indicated by the wavy orientation of the yarns 22 adjacent the bottom surface 26 of the lamina (FIG. 3) and the straight orientation of the yarns 22 adjacent the top surface 24 of the lamina (FIG. 2). Nevertheless, the aramid yarns 22 visible at each surface are aligned with each other in the lengthwise direction of the lamina 16 because the yarns 22 are maintained under substantial tension throughout the process of FIG. 5. In turn, this provides the beneficial ability of the individual aramid fibers of the reinforcing lamina sheets 16 to assume load at the same time as described in more detail below.

Additionally, the rough upper and lower surfaces 24 and 26 of the laminate sheet 16 provide a superior bonding surface when the reinforcing lamina sheet 16 is incorporated into the glue laminate beam 10 (FIGS. 1 and 4). This is because the adhesive, such as resorcinol formaldehyde, seeps into the transverse cracks and longitudinal depressions 17 giving it a greater bonding surface with the wood layers 14 of the glue laminate beam 10. While any length or width of the reinforcing lamina sheet may be formed according to the present invention, a sheet having a thickness of between 0.005 and 1.50 inches and, preferably about 0.070 inches, and a width of between 30 inches and 130 inches and, preferably 80 inches, has been found to achieve desirable results.

Figure 8:
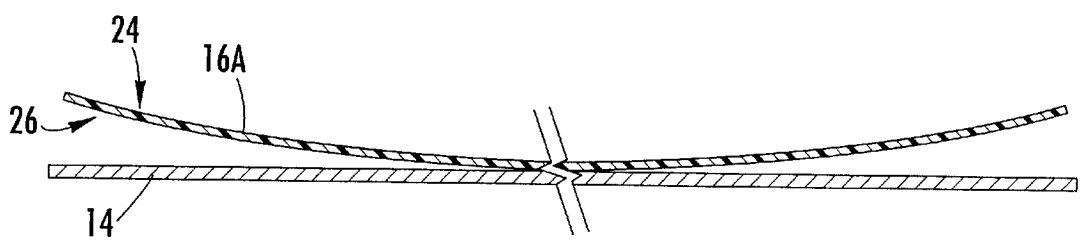
FIG. 8 is a side elevational view illustrating formation of a glue laminate beam employing a reinforcing lamina of the invention.
Figure 9:
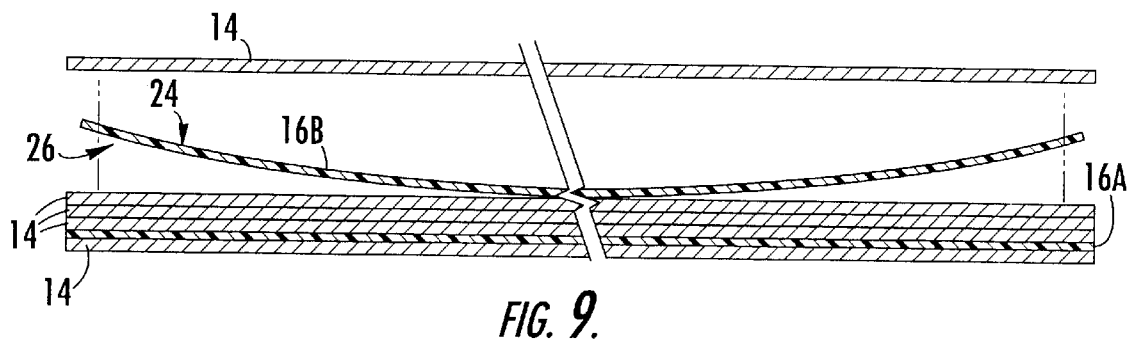
FIG. 9 is a side elevational view illustrating formation of a glue laminate beam employing two reinforcing lamina of the invention with the reinforcing lamina being positioned near the outer surfaces of the glue laminate beam.

FIGS. 8 and 9 illustrate a preferred process in which the reinforcing lamina sheet 16 is assembled within the glue laminate beam 10. As illustrated in FIG. 8, the bottom layer is a wood layer 14 and the lower lamina sheet 16A is positioned above the bottom-most wood layer 14. Due to the process described above, the lower lamina 16A has a curved configuration. To maximize the strength of the reinforcing lamina sheet 16, it is preferably positioned in the upwardly concave position shown in FIG. 8. For the sake of illustration and discussion, this curvature has been exaggerated somewhat in FIGS. 8 and 9. As illustrated in FIG. 9, one or more wood layers 14 are then positioned upon the lower reinforcing lamina 16A, thereby straightening the reinforcing lamina 16A. An uppermost reinforcing lamina 16B is then positioned between additional wood layers 14 and is straightened out in much the same manner as the lower lamina 16A. Of course, any number of lamina 14 or 16 may be used to form the glulam beam 10.

An adhesive is applied between the successive layers of the glulam beam 10. While not bound to this theory, it is believed that the use of epoxy resin as the resin binder in the lamina sheets 16 provides additional bonding when resorcinol formaldehyde is an adhesive as is normally the case when wood lamina are used. In addition, improved bonding is achieved because of the ability of the adhesive to penetrate more deeply into the formed reinforcing lamina sheet 16 due to the valleys 17. Of course, any adhesive may be utilized without departing from the present invention. The beam is then allowed to cure, preferably for 24 hours at room temperature with multiple C-clamps mounted to the glulam beam 10. As stated above, the adhesiveness is enhanced by the discontinuous surfaces 24 and 26 of the reinforcing lamina sheet 16. Thus, the abrasion step required with Lamina formed by pultrusion is avoided. Preferably, the reinforcing lamina sheet 16 formed with aramid fibers is positioned on the tension, or lower, area of the glulam beam 10. In one embodiment, carbon fibers are used in place of aramid fibers and produced according to the process of the present invention. The resulting reinforcing lamina sheet 16 having carbon fibers is then positioned adjacent the upper most lamina within the glulam beam 10 to take compressive stress. It is within the scope of the present invention to utilize any type of fiber within the lamina sheet 16. Also, multiple reinforced lamina sheets 16 may be used with each reinforced lamina sheet glued to the other using the adhesive used to bond the reinforced lamina sheet to the wood.

Because the reinforcing lamina sheet 16 is cured in a curved configuration, when the reinforcing lamina sheet is straightened, a uniform tension on the unidirectional fibers is believed to result when a load F1 is applied to the glue laminate beam 10 particularly after slight flexing of the beam. Thus, when the load bearing force F1 is applied to the glue lamina beam 10, the beam 10 can absorb a certain amount of bending and the reinforcing lamina sheets 16B and 16A bend slightly until the point wherein each of the fibers 22 take load at the same time. One of the advantages of the glue laminate beam 10 having the reinforcing lamina sheet 16 according to the present invention is that superior strength results due, at least in part, to the ability of the fibers of the reinforcing lamina sheet to receive load at substantially the same time when the beams is slightly bent or flexed.

As is apparent, the aramid fibers within the reinforcing lamina sheet 16 are unidirectional providing the reinforcing lamina sheet with superior strength in one direction. Due to the superior strength of the reinforcing lamina sheet 16, it may be difficult to cut varying widths of the cured band 68 to form the lamina sheet 16 or to finish edges of the lamina sheet. In a preferred embodiment, non-aramid or weaker aramid fibers, such as rayon, are provided at discrete locations across the transverse width of the cured band 68. As shown in FIG. 2, the non-aramid or weaker fibers, such as rayon. 72, are arranged so as to provide selvage edges so that the reinforcing lamina sheet 16 may be cleanly severed in the longitudinal direction or otherwise machined for particular applications. The weaker fibers 72 are preferably processed simultaneously with the aramid fibers 22. As shown in FIG. 5, the weaker fibers 72 may be placed on predetermined creels 28 and maintained in proper alignment due to the rollers 34, and the comb 36.

An alternative process according to the present invention for forming reinforcing lamina sheets 16 is illustrated in FIG. 6. The second embodiment differs from the first in that only one large diameter heated drum 52 is provided. The impregnated band 48 is drawn from the resin bath 42 and is partially cured about the heated surface of drum 52 wherein cross-linking of the resin at least on the contacting surface 51 is effected. The now partially cured band 56 is transferred through the oven 58 wherein both sides 51 and 53 of the band 56 are contacted with heat so that further cross-linking and curing of the resin occurs. The cured band 68 is then wound about the mandrel 66 in the same manner as the first embodiment.

A third embodiment of the process according to the present invention is illustrated in FIG. 7 wherein the oven 58 shown in the first and second process embodiments is omitted. As illustrated, the impregnated band 48 is withdrawn from the resin bath 42 and is partially cured around the curved heated surface of drum 52. The now partially cured band 56 is pulled around the surface of the second heated drum 64 wherein the partially cured surface 51 which contacted the heated surface 52 becomes fractured in at least a portion thereof. The second heated drum 64 further cures the substantially cured band 62 at least adjacent the second surface 53 thereof and further promotes cross-linking of the thermoset resin. The now cured band 68 is wound about the mandrel 66 where it is permitted to cool in a curved configuration.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

What is claimed is:

1. A reinforcing lamina sheet for improving the tensile or compressive loading of the wood members in glue laminated articles comprising:

a substantially planar band defined at least by a first set of substantially unidirectionally oriented filaments wherein said filaments are aligned under tension, a resin matrix filling the interstices between the filaments, wherein said matrix is at least partially cured so that the resin matrix and filaments have a curved configuration along the lengthwise direction of the filaments, and wherein the sheet has opposite first and second outer surfaces at least one of which has fractures in said matrix caused by bending the sheet after said partial curing in a direction opposite to the curvature of said curved configuration.

2. The reinforcing lamina sheet according to claim 1 wherein said unidirectional fibers are aramid fibers.

3. The reinforcing lamina sheet according to claim 1 wherein said resin is an epoxy resin.

4. The reinforcing lamina sheet according to claim 1 further comprising a plurality of second filaments different than said first filaments, said second filaments being structurally weaker in at least the lengthwise direction than said first set of filaments for forming selvages of said lamina.

5. The reinforcing lamina sheet according to claim 4 wherein said second filaments are non-aramid fibers.

6. The reinforcing lamina sheet according to claim 4 wherein said non-aramid fibers are rayon.

7. A reinforcing lamina sheet for improving the tensile or compressive loading of the wood members in glue laminated articles comprising:

a substantially planar band defined by unidirectionally oriented filaments; and a heat curable resin forming a matrix between the filaments wherein said reinforcing lamina sheet is substantially non-planar when cured and wherein said reinforcing sheet comprises a first outer surface and an opposing second surface wherein at least one of said surfaces is at least partially fractured by at least partially curing the resin so that the sheet is set in a curved configuration and subsequently bending the at least partially cured sheet in a direction opposite to the curvature of said curved configuration so as to cause fractures in said matrix.

8. A glue laminated beam having increased tensile and compressive strength comprising:

a plurality of substantially planar layers bonded together wherein at least one layer is formed of a wood product and at least one reinforcing lamina sheet arranged to increase the tensile or compressive strength of said wood product, said reinforcing lamina sheet comprising a substantially planar band defined by unidirectionally oriented filaments and a heat curable resin forming a matrix between the filaments, wherein said impregnated band is set in a curved configuration prior to incorporation into said beam.

9. The glue laminate beam according to claim 8 wherein said at least one wood product layer and said at least one reinforcing lamina sheet are adhered to one another by a resorcinol formaldehyde adhesive.

10. A glue laminated beam having increased tensile and compressive strength comprising:

a plurality of layers bonded together wherein at least one layer is formed of a wood product and at least one layer comprises a reinforcing lamina sheet arranged to increase the tensile or compressive strength of said wood product, said reinforcing lamina sheet comprising a substantially planar band defined by unidirectionally oriented filaments and a heat curable resin forming a matrix between the filaments, wherein prior to incorporation into said beam said impregnated band is set in a curved configuration and is then bent in a direction opposite to the curvature of said curved configuration so as to cause fractures in the matrix in at least one outer surface of the reinforcing lamina sheet, whereby the fractures enhance bonding of the reinforcing lamina sheet to an adjacent layer.

11. A reinforcing lamina sheet for improving the tensile or compressive loading of the wood members in glue laminated articles comprising:

a substantially planar band defined at least by a first set of substantially unidirectionally oriented filaments wherein said filaments are aligned under tension, a resin matrix filling the interstices between the filaments, said matrix being at least partially cured so that the resin matrix and filaments have a curved configuration along the lengthwise direction of the filaments, and a plurality of second filaments forming selvages of the reinforcing lamina sheet, the second filaments being easier to cut and machine than the first filaments to facilitate trimming said selvages during fabrication of a glue laminated article incorporating the reinforcing lamina sheet.

* * * * *